United States Patent
Mazzara, Jr.

(10) Patent No.: US 7,110,537 B2
(45) Date of Patent: Sep. 19, 2006

(54) MOBILE VEHICLE HOUSING FOR A PORTABLE COMMUNICATION DEVICE

(75) Inventor: William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 458 days.

(21) Appl. No.: 10/172,880

(22) Filed: Jun. 17, 2002

(65) Prior Publication Data
US 2004/0202312 A1    Oct. 14, 2004

(51) Int. Cl.
*H04M 9/00* (2006.01)
*H04M 1/00* (2006.01)
*H04B 1/10* (2006.01)

(52) U.S. Cl. .............. 379/437; 379/451; 455/300; 455/575.9

(58) Field of Classification Search .......... 379/437, 379/451, 446, 455; 455/90.3, 300, 575.9, 455/575.5, 575.8
See application file for complete search history.

(56) References Cited

U.S. PATENT DOCUMENTS

| | | | | |
|---|---|---|---|---|
| 5,493,702 A | * | 2/1996 | Crowley et al. | 455/575.5 |
| 5,535,439 A | * | 7/1996 | Katz | 455/575.5 |
| 5,539,148 A | * | 7/1996 | Konishi et al. | 455/300 |
| 6,031,492 A | * | 2/2000 | Griffin et al. | 455/575.9 |
| 6,711,387 B1 | * | 3/2004 | Lungley | 455/90.3 |

* cited by examiner

*Primary Examiner*—William J. Deane, Jr.
(74) *Attorney, Agent, or Firm*—Cardinal Law Group

(57) ABSTRACT

The invention provides a device for enhancing performance of a portable cellular phone within a mobile vehicle. The device includes a housing located within the vehicle into which a portable cellular phone may be placed. The housing includes an exterior layer that reflects noise signals and an interior layer that reduces reflection of communication signals within the housing. Signals are transmitted between the cellular phone and an exterior-mount transceiver by means of a wireless RF coupling device that is contained within the housing and connected to the exterior-mount transceiver using a coaxial cable.

19 Claims, 3 Drawing Sheets

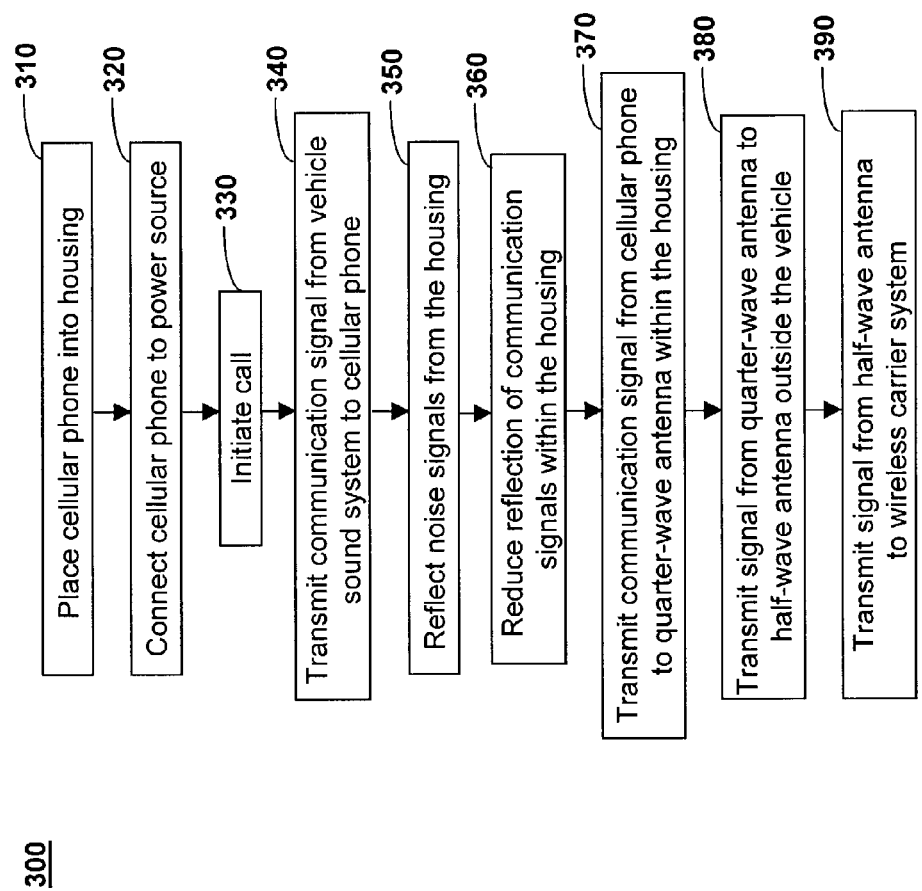

MOBILE VEHICLE HOUSING FOR A PORTABLE COMMUNICATION DEVICE

FIELD OF THE INVENTION

This invention relates generally to wireless data transmission. More specifically, the invention relates to a device for enhancing performance of a portable wireless communication device within a mobile vehicle.

BACKGROUND OF THE INVENTION

Wireless communication devices are commonly available as factory-installed features for mobile vehicles. Speech recognition technology allows a subscriber to place hands-free, voice-activated calls on a wireless network. Typically, a microphone is embedded in the vehicle, and conversation is heard through the vehicle's sound system speakers. Because the communication device is integrated into the vehicle, a factory-installed exterior antenna can be connected to the device to optimize reception and transmission of the radio frequency (RF) signal used by the device.

Vehicle manufacturers are pursuing ways of offering hands-free calling for vehicle owners who wish to use their personal portable cellular phones within the vehicle. The portable phone may be connected to the vehicle sound system using the same types of wireless interface provided for factory-installed wireless communication systems.

However, the portable phone may have very poor performance within the vehicle because the metal body and frame of the car tend to impede reception and transmission of the RF signals. Performance can be greatly enhanced by connecting the portable phone to an exterior antenna. Unfortunately, the RF coupler required to connect a portable cellular phone to an exterior antenna varies widely from one cellular provider to another and from one phone model to another. Thus, a vehicle manufacturer cannot offer a roof-mount antenna system as a factory-installed feature because the physical interface to the cellular phone is not universal.

A device is needed that will provide a universal means of coupling a personal portable cellular phone with an antenna mounted on the exterior of the vehicle, thereby providing enhanced performance of the phone. Such a device would allow a vehicle manufacturer to offer a factory-installed exterior antenna system for use with any portable wireless communication device.

Therefore, it would be desirable to provide a device for enhancing performance of a portable wireless communication device within a mobile vehicle that overcomes the aforementioned and other disadvantages.

SUMMARY OF THE INVENTION

One aspect of the invention provides a device for enhancing performance of a portable wireless communication device within a mobile vehicle. The device includes a housing to receive a portable wireless communication device. The housing includes an exterior reflective layer and an interior nonreflective layer. An RF coupling device is positioned within the housing. A transceiver positioned on an exterior surface of the vehicle is connected to the RF coupling device.

Another aspect of the invention provides a method for enhancing performance of a portable wireless communication device within a mobile vehicle. The portable wireless communication device is placed within an enclosed housing. Noise signals are reflected from the housing. Reflection of communication signals within the housing is reduced. Signals are transmitted and received between the enclosed communication device and a transceiver positioned on an exterior surface of the vehicle.

Yet another aspect of the invention provides a system for enhancing performance of a portable wireless communication device within a mobile vehicle. The system includes means for enclosing the portable wireless communication device, for reflecting noise from the enclosing means, for reducing reflection of communication signals within the enclosing means, and for transmitting and receiving signals between the enclosed communication device and a transceiver operably positioned on an exterior surface of the vehicle.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a flow diagram of one embodiment of a method for enhancing performance of a portable wireless communication device within a mobile vehicle in an example system according to FIG. 2.

DETAILED DESCRIPTION OF THE PRESENTLY PREFERRED EMBODIMENTS

Figure 1:
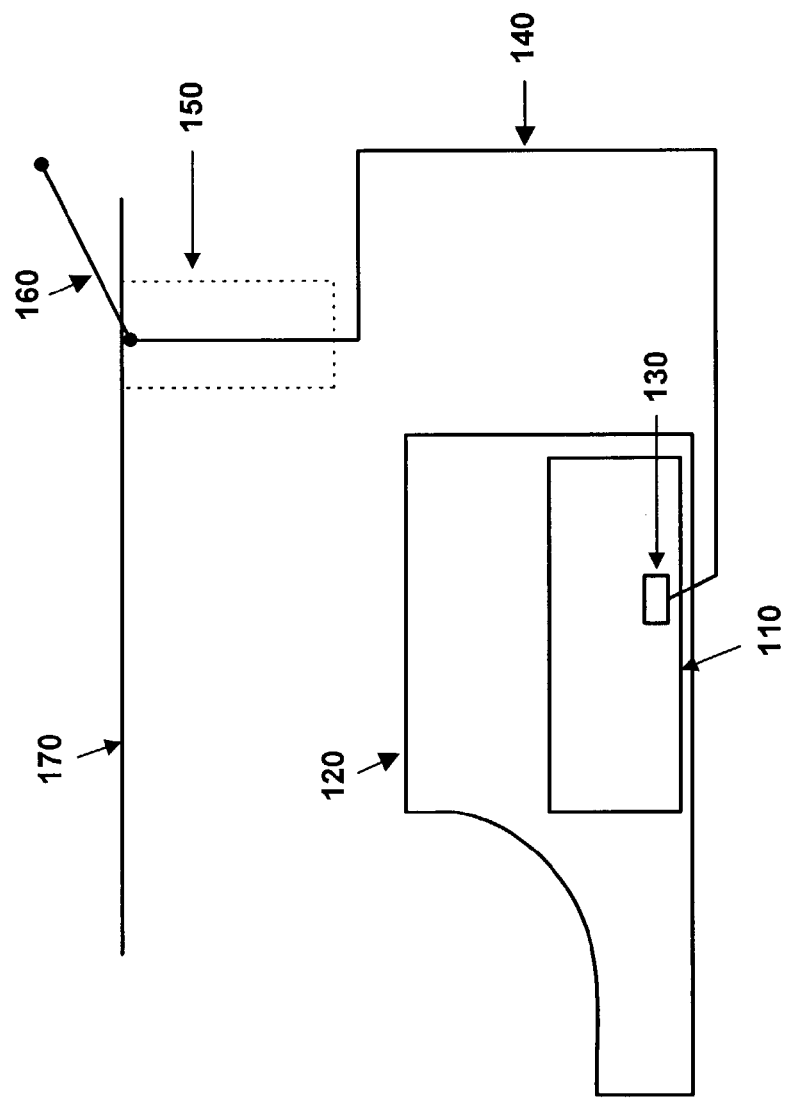
FIG. 1 is an illustration of one embodiment of a device for enhancing performance of a portable wireless communication device within a mobile vehicle, in accordance with the present invention.

FIG. 1 shows an illustration of one embodiment of a device for enhancing performance of a portable wireless communication device within a mobile vehicle, in accordance with the present invention at 100.

Wireless communication performance enhancing device 100 may include a housing 110 located in the console 120 of a vehicle, an RF coupling device 130 positioned within the housing, a coaxial cable 140 that is routed along a vehicle pillar 150, and a transceiver 160 located on the vehicle roof 170.

Housing 110 may be, for example, a foam box covered with foil. The foil covering may be aluminum. The housing may have a closable opening such as a hinged lid through which a portable wireless communication device, for example, a portable cellular phone, may be inserted or removed. The foil covering over the housing may provide an exterior reflective layer that reflects noise signals away from the enclosed portable wireless communication device. The foam may provide an interior nonreflective layer that absorbs communication signals that strike the interior walls of the housing, reducing reflection of communication signals within the housing.

Housing 110 may be positioned within the console 120 of a vehicle. It may also be positioned within the glove box of the vehicle or in any other appropriate location within the vehicle. The hinged lid of the housing 110 may be integrated into the console 120 of the vehicle.

An RF coupling device 130 may be positioned within the housing 110. The RF coupling device may receive RF signals from and transmit RF signals to the enclosed portable cellular phone. The RF coupling device may be, for example, a quarter-wave antenna.

The RF coupling device 130 may be connected by means of a coaxial cable 140 to a transceiver 160 positioned on any appropriate exterior surface of the vehicle, for example the roof or hood or trunk of the vehicle or a front or rear windshield. The cable may be, for example, routed along a vehicle pillar 150 to the vehicle's roof 170.

Transceiver 160 may be a half-wave antenna or any appropriate RF signal transceiver known in the art. Transceiver 160 may receive signals from and transmit signals to a wireless carrier system.

Figure 2:
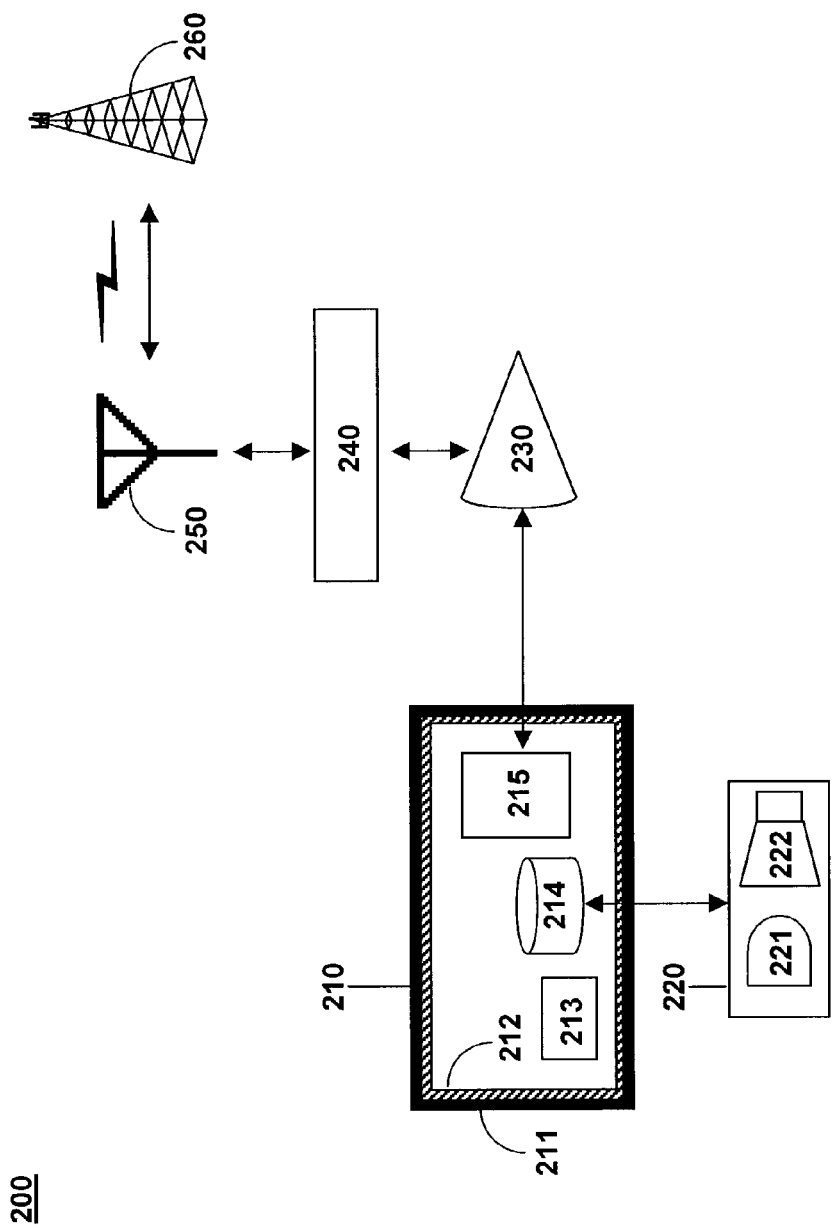
FIG. 2 is an illustration of one embodiment of a system for enhancing performance of a portable wireless communication device within a mobile vehicle, in accordance with the present invention.

FIG. 2 shows an illustration of one embodiment of a system for enhancing performance of a portable wireless communication device within a mobile vehicle, in accordance with the present invention at 200.

Wireless communication performance enhancing system 200 may contain one or more housings 210, one or more vehicle sound systems 220, one or more RF signal amplifiers 230, one or more coaxial cables 240, one or more transceivers 250, and one or more wireless carrier systems 260. Housing 210 may include a reflective layer 211 and a nonreflective layer 212 and may contain one or more power sources 213, one or more wireless transceivers 214, and one or more RF coupling devices 215. Vehicle sound system 220 may contain one or more microphones 221 and one or more speakers 222.

Housing 210 may be positioned within the console of a vehicle or in any other appropriate location within the vehicle. The housing may have a closable opening such as a hinged lid through which a portable wireless communication device, for example a portable cellular phone, may be inserted or removed. The hinged lid of the housing may be integrated into the console of the vehicle.

Housing 210 may include an exterior reflective layer 211 and an interior nonreflective layer 212. The exterior reflective layer 211 may be a foil covering. The foil covering may be, for example, aluminum. The foil covering may reflect noise signals from the housing, thereby shielding the enclosed portable cellular phone from these extraneous signals.

The interior nonreflective layer 212 may be foam. The foam may absorb communication signals that strike the interior walls of the housing, thereby reducing reflection of communication signals within the housing.

Housing 210 may contain a power source 213. A portable cellular phone may be connected to power source 213 to permit charging of the phone while it is enclosed within the housing 210.

Housing 210 may also contain a wireless transceiver 214. Wireless transceiver 214 may use, for example, Bluetooth technology operating in the unlicensed Industrial Scientific-Medical (ISM) frequency band at 2.4 GHz, or IrDA (Infrared Data Association) standard infrared transmissions at a nominal wavelength of 875 nm, or an 802.11 interface, or any other appropriate technology.

Wireless transceiver 214 may transmit and receive signals between the enclosed portable cellular phone and a vehicle sound system 220. Vehicle sound system 220 may contain at least one microphone 221 and at least one speaker 222. The microphone 221 may be used by the cellular phone service subscriber, in combination with a speech recognition technology, to place hands-free phone calls. Conversations may be heard through one or more of the vehicle sound system speakers 222.

Housing 210 may also contain an RF coupling device 215. The coupling device may be, for example, a quarter-wave antenna. RF coupling device 215 may be connected by means of a coaxial cable 240 to a transceiver 250 and may transmit and receive RF signals between transceiver 250 and the enclosed cellular phone. The RF signals may be amplified by an amplifier 230. Amplifier 230 may be bidirectional.

Transceiver 250 may be, for example, a half-wave antenna. Transceiver 250 may be positioned on any appropriate exterior surface of the vehicle, for example the roof or hood or trunk of the vehicle or a front or rear windshield, and may receive signals from and transmit signals to a wireless carrier system 260.

FIG. 3 shows a flow diagram of one embodiment of a method for enhancing performance of a portable wireless communication device within a mobile vehicle, in accordance with the present invention at 300. Method 300 comprises steps to place a portable wireless communication device within an enclosed housing, to reflect noise signals from the housing, to reduce reflection of communication signals within the housing, and to transmit and receive signals between the enclosed communication device and a transceiver positioned on an exterior surface of the vehicle.

Using an example system according to FIG. 2, a cellular service subscriber may place a personal portable cellular phone into a housing contained within the vehicle glove compartment of a mobile vehicle (Block 310). The housing may have a hinged lid integrated into the glove compartment that may be opened to insert or remove the cellular phone and then closed to provide full enclosure of the phone within the housing.

The housing may contain a power source. The subscriber may connect the cellular phone to the power source (Block 320) to permit the phone to be charged while it is enclosed within the housing.

The subscriber may initiate a call (Block 330) by issuing a verbal command through a microphone that is embedded in the vehicle and that forms part of the vehicle sound system. The communication signal generated by the subscriber may then be transmitted from the vehicle sound system to the enclosed cellular phone (Block 340). This may be accomplished by means of a wireless transceiver using, for example, Bluetooth technology.

Noise signals may be reflected from the housing by an exterior foil layer (Block 350). An interior foam layer may absorb communication signals that strike the interior walls of the housing, reducing reflection of these signals within the housing (Block 360).

The communication signal initially generated by the subscriber's voice and transmitted to the enclosed cellular phone by means of the wireless transceiver may be transmitted from the cellular phone to a quarter-wave antenna positioned within the housing (Block 370). The communication signal may then be transmitted from the quarter-wave antenna by means of a coaxial cable to a half-wave antenna positioned on the exterior of the vehicle (Block 380). The half-wave antenna may transmit the signal to a wireless carrier system (Block 390).

Similarly, a communication signal may be received from the wireless carrier system by the half-wave antenna positioned on the exterior of the vehicle, transmitted from the half-wave antenna through a coaxial cable to the quarter-wave antenna within the housing, transmitted from the quarter-wave antenna to the enclosed portable cellular phone, transmitted from the portable cellular phone to the wireless transceiver, and then transmitted by the wireless transceiver to one or more vehicle sound system speakers. The communication signal is heard by the cellular service subscriber when it is broadcast through the speakers.

In practice, the described method may be used by a cellular phone service subscriber to enhance performance of a portable wireless communication device operated within a mobile vehicle. By not only shielding the communication device from noise signals, but also efficiently transmitting communication signals between the communication device and an exterior-mount antenna, both transmission and reception of the cellular phone may be improved, thereby increasing subscriber satisfaction.

In addition, the present invention allows a vehicle manufacturer to offer a roof-mount antenna system as a factory-installed feature because the invention provides a wireless interface between the portable cellular phone and an exterior-mount antenna, thereby eliminating the problem of the current nonstandard and highly variable physical interfaces.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A device for enhancing performance of a portable wireless communication device within a mobile vehicle, comprising:
    a housing to enclose the portable wireless communication device, the housing including an exterior reflective layer and an interior nonreflective layer;
    an RF coupling device positioned within the housing; and
    a transceiver positioned on an exterior surface of the vehicle, the transceiver operably connected to the RF coupling device,
    wherein the exterior reflective layer reflects extraneous noise signals away from the housing.

2. The device of claim 1 wherein the RF coupling device is a quarter-wave antenna.

3. The device of claim 1 wherein the transceiver is an antenna.

4. The device of claim 1 wherein the RF coupling device and the transceiver are operably connected using a coaxial cable.

5. The device of claim 1 wherein the nonreflective layer comprises foam.

6. The device of claim 1 wherein the reflective layer comprises metal.

7. The device of claim 6 wherein the metal comprises aluminum.

8. The device of claim 1 wherein the housing includes a closable opening through which the portable wireless communication device may be inserted or removed.

9. The device of claim 1 further comprising:
an RF signal amplifier.

10. The device of claim 1 further comprising:
a second transceiver operably positioned within the housing, the second transceiver operably connected to a vehicle sound system.

11. The device of claim 1 further comprising:
a power source positioned within the housing, the power source compatible with the portable wireless communication device.

12. A method for enhancing performance of a portable wireless communication device within a mobile vehicle, comprising:
    enclosing the portable wireless communication device within a housing;
    reflecting noise signals from outside the housing;
    reducing reflection of communication signals within the housing; and
    transmitting and receiving signals between the enclosed communication device and a transceiver operably positioned on an exterior surface of the vehicle.

13. The method of claim 12 further comprising:
transmitting and receiving signals between the enclosed communication device and a sound system within the vehicle.

14. The method of claim 12 further comprising:
amplifying the transmitted and received signals.

15. The method of claim 12 further comprising;
providing power to the portable wireless communication device.

16. A system for enhancing performance of a portable wireless communication device within a mobile vehicle, comprising:
    means for enclosing the portable wireless communication device;
    means for reflecting noise from outside the enclosing means;
    means for reducing reflection of communication signals within the enclosing means; and
    means for transmitting and receiving signals between the enclosed communication device and a transceiver operably positioned on an exterior surface of the vehicle.

17. The system of claim 16 further comprising:
means for transmitting and receiving signals between the enclosed communication device and a sound system within the vehicle.

18. The system of claim 16 further comprising:
means for amplifying the transmitted and received signals.

19. The system of claim 16 further comprising;
means for providing power to the portable wireless communication device.

* * * * *